United States Patent
Babcock et al.

(10) Patent No.: US 6,542,359 B2
(45) Date of Patent: Apr. 1, 2003

(54) APPARATUS AND METHOD FOR COOLING A WEARABLE COMPUTER

(75) Inventors: Raymond Floyd Babcock, Stewartville, MN (US); Matthew Allen Butterbaugh, Rochester, MN (US); Sukhvinder Singh Kang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 09/748,904

(22) Filed: Dec. 27, 2000

(65) Prior Publication Data

US 2002/0080577 A1 Jun. 27, 2002

(51) Int. Cl.$^7$ ............................................. H05K 7/20
(52) U.S. Cl. ..................... 361/687; 361/712; 165/80.4; 174/15.2
(58) Field of Search ................... 361/715, 708, 361/700, 703, 687, 712–714; 165/80.4, 104.33; 174/15.1, 15.2

(56) References Cited

U.S. PATENT DOCUMENTS

| | | | | |
|---|---|---|---|---|
| 5,875,095 A | * | 2/1999 | Webb | 361/700 |
| 5,926,371 A | * | 7/1999 | Dolbear | 361/704 |
| 5,945,217 A | * | 8/1999 | Hanrahan | 428/389 |
| 6,026,890 A | * | 2/2000 | Akachi | 165/104.26 |
| 6,115,251 A | * | 9/2000 | Patel et al. | 361/699 |
| 6,315,038 B1 | * | 11/2001 | Chiu | 165/185 |
| 6,351,387 B1 | * | 2/2002 | Prasher | 361/707 |

* cited by examiner

Primary Examiner—Darren Schuberg
Assistant Examiner—Hung Van Duong
(74) Attorney, Agent, or Firm—Wood, Herron & Evans, LLP

(57) ABSTRACT

A computer comprises a chassis having an inner surface and an outer surface and a processing device contained within the chassis. A portion of the chassis inner surface is positioned proximate to the processing device, and a sheet of thermally conductive interface material is positioned between and contacts the processing device and the inner surface portion to thermally couple the processing device to the chassis so that the heat generated by the processing device is delivered to the chassis. The outer surface of the chassis is configured, such as with fins, for dissipating heat from the chassis. A phase-change material is positioned on the inner surface of the chassis and absorbs heat to further assist the chassis in heat dissipation.

23 Claims, 4 Drawing Sheets

APPARATUS AND METHOD FOR COOLING A WEARABLE COMPUTER

FIELD OF THE INVENTION

This invention relates generally to computers, and more specifically to a system and method for cooling computers which are wearable on the body of a user.

BACKGROUND OF THE INVENTION

As personal computers have become more popular in everyday life, they have also become more indispensable in the daily activities of a computer user. As such, many computer users desire almost constant access to their computers. As technology and communications advance and more goods and services are available through the use of a computer, such as over the Internet, the desire for constant access will continue to increase among computer users.

Conventionally, computers utilized by individuals and businesses are stand-alone devices which are generally permanently placed on a desk top, table top, or other support surface. While they may be readily moved from place to place, they are not meant to be constantly carried around by the user. To address the need for portability, portable computers are available which are carried by the user, generally in a specially made suitcase or bag. Existing portable computers continue to decrease in size and weight, but are still designed to be carried like luggage in a separate bag or other container and are then used by placing them on an available flat surface, such as a desk top.

Recently, wearable computers have become available. Wearable computers, such as a wearable personal computer, are worn or carried, and also used, on the body of the user. Therefore, the wearable computer is usually carried around without having to be stowed in a bag and hand-carried like luggage. Furthermore, a wearable computer is more likely to be used while being worn, rather than being taken off and placed on a support surface. This arrangement provides the user with greater mobility, convenience, and flexibility in the use of their computer.

As with other computers, a wearable computer has internal electronic components which generate heat during their operation and the operation of the computer. In particular, the processor component(s) of a computer consumes a significant amount of power and thus generates a substantial amount of heat. Consequently, the electronic components, and particularly processor components, must be cooled for proper operation. In addition to ensuring proper operation of internal electronic components, wearable computers also must be cooled sufficiently to ensure the comfort of the wearer. Unlike desktop or portable computers, wearable computers will generally be in contact with the user's body and possibly their bare skin. In existing computers, an internal air moving device, such as an internal fan, is utilized to direct cooling air over the heat-generating components to cool those components. However, existing air moving and cooling systems for computers, while functional for conventional desktop or portable computers, have certain drawbacks with respect to their incorporation into a wearable computer.

Specifically, internal air moving devices, like fans, require relatively large airflow openings in the body or housing of the computer for feeding and exhausting air to and from the internal volume of the computer to cool the electronic components. Relatively large air flow openings and fans are suitable for existing desktop and portable computers, because those forms of computers will primarily be used indoors and thus are not significantly exposed to outside environmental elements, such as water and dirt. However, wearable computers are worn by a user and are therefore exposed to the environmental elements to which the user is exposed. Consequently, a wearable computer will be exposed to water, dirt, and other contaminant elements more frequently than other forms of a computer. Large airflow openings and fans which draw air through the openings also allow the water, dirt, and other contaminating elements into the internal volume of the computer and expose the electronic components to such contaminating elements. Any contamination or corrosion from exposure to environmental elements may impede the operation of the computer or even permanently damage it. Therefore, while traditional fan systems may be used to cool a wearable computer, they present contamination and operational risks.

Some versions of wearable computers have been cooled without an internal fan. However, those designs still use relatively large airflow openings. Furthermore, the convective heat transfer between the air surrounding the components and the computer body is very inefficient. This inefficiency results in higher internal temperatures and less reliable operation.

Therefore, it is an objective to improve the design and operation of computers, and more specifically to improve the cooling characteristics of a wearable computer.

It is another objective to reduce and eliminate exposure of the electronic components of a wearable computer to environmental elements which may adversely affect the operation of the computer.

It is still another objective to provide a comfortable computer for a user to wear without exposing the user to uncomfortably hot surfaces.

These objectives and other objectives of the present invention will become more readily apparent from the further description of the invention below.

SUMMARY OF THE INVENTION

In accordance with the above objectives and other objectives, the present invention provides a computer, or more specifically, a wearable computer, which does not utilize an internal fan or large openings in the body thereof for contaminants to enter. The computer comprises a chassis having an inner surface and an outer surface, and at least one processing device, such as a processor, or other heat-generating electronic component contained within the chassis. A portion of the chassis inner surface is positioned proximate to the processing device, and is thermally coupled to the processing device through a sheet of thermally conductive interface material. The sheet of thermally conductive interface material is preferably compliant, and is positioned between and simultaneously contacts the processing device and the inner surface portion. The compliant interface material is preferably pressed or squeezed between the processing device and chassis inner surface portions to provide efficient thermal coupling of the processing device to the chassis. In that way, heat generated by the processing device is conductively delivered to the chassis where it is further dissipated. The chassis is formed of a material with good thermal conductivity, such as aluminum or magnesium.

In accordance with another aspect of the present invention, an outer surface of the chassis is configured for dissipating heat from the chassis and, in one embodiment, includes a plurality of fins which are configured to convectively dissipate heat from the chassis. The fins may be shrouded with a shroud or other cover, which is configured to form a restricted air passage and to define inlets and an exhaust opening for more efficient convective airflow across and around the fins. The shroud may be formed of a thermally insulative material, such as a suitable plastic, for preventing contact between a user's skin and the heated fins. The shroud may simply be part of the computer chassis or may house additional components, such as a battery.

In accordance with another aspect of the present invention, to further improve heat dissipation from the processing device, an amount of phase-change material is positioned on the inner surface of the chassis proximate the processing device. The phase-change material, for example, paraffin, is operable for absorbing heat from the processing device and changing phase (e.g. from solid to liquid) upon absorption of an amount of heat. The phase-change material assists the chassis in removing heat from the processing device, such as when the efficient convection and dissipation of heat through the fins is compromised or interrupted due to the position of the computer chassis and the finned outer surface.

In accordance with another aspect of the present invention, additional electronic and/or processing devices within the computer which generate heat when operating are thermally coupled to a heat pipe, such as a copper heat pipe. The heat pipe is also thermally coupled to the chassis to absorb heat from the electronic devices and transfer the heat to the chassis to be dissipated. In one embodiment of the invention, the heat pipe is a copper heat pipe in the form of a ribbon wherein one side or surface of the heat pipe is adhesively coupled to the electronic devices, and wherein the other side or surface of the heat pipe is adhesively coupled to an inner surface of the chassis.

The multiple cooling elements and the system of the present invention provide for effective and safe dissipation of heat from the computer so the computer may be worn comfortably while its internal temperature, and the temperature of the internal electronic devices, is maintained within a proper operational range. The present invention provides for efficient heat transfer while reducing the number of openings within the computer through which water, dirt, and other contaminating elements may pass. Therefore, the contamination of the internal electronic components, and the degradation of their operation, is reduced.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION OF THE INVENTION

Figure 1:
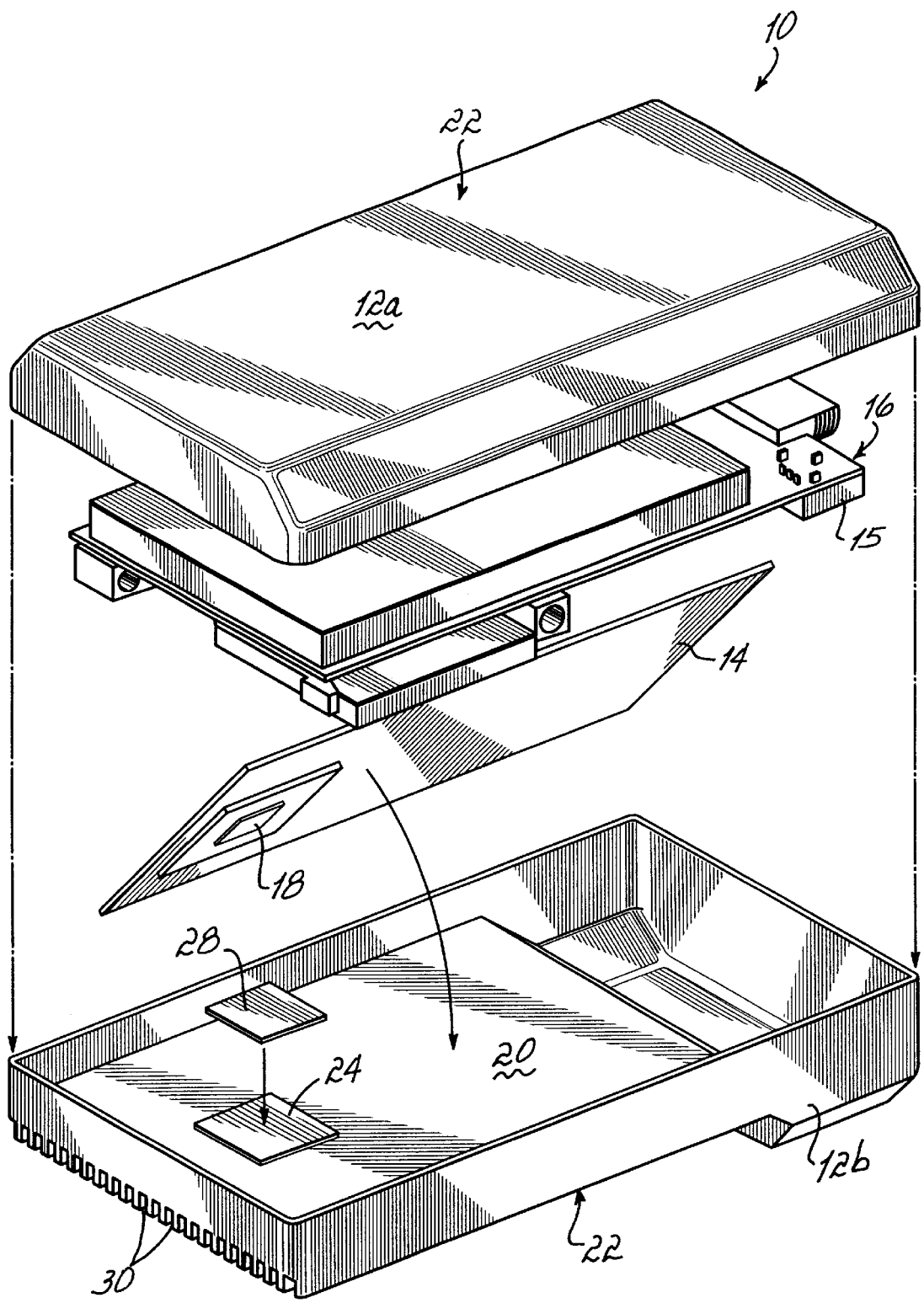
FIG. 1 is an exploded perspective view of one embodiment of the present invention.

FIG. 1 is an exploded perspective view of a computer that is suitable as a wearable computer in accordance with the principles of the present invention. FIG. 1 discloses one embodiment of a wearable computer which is more efficiently and effectively cooled in accordance with the principles of the present invention. While the invention described herein is suitable for use with all computers and other electronic devices having internal electronic components which must be cooled, the invention is particularly useful for wearable computers.

Wearable computer 10 comprises a chassis 12 which encloses the internal electronic and other components of the computer. Chassis 12, in the embodiment illustrated in the figures, includes a top portion 12a and a bottom portion 12b. Chassis 12 is fabricated, at least in part, of a suitable thermally conductive material, such as aluminum, magnesium or copper, for example. Preferably, the material forming chassis 12 has desirable thermally conductive and dissipative properties to allow the heat generated by the various components and devices of the wearable computer 10, which is delivered to the chassis, to dissipate over the surfaces of the chassis. Depending upon the material of chassis 12 and its thermal conductive properties, the overall thickness of the walls may be varied.

Referring to FIG. 1, computer 10 further includes a plurality of electronic components and devices 15, 18 which are positioned and mounted on one or more circuit boards 14, 16. In the Figures of the present application, two circuit boards 14, 16 are shown. However, only a single circuit board may be necessary, or a greater number of circuit boards may be utilized, depending upon the design of the computer and its various hardware systems.

Circuit board 14 contains or supports a processing device 18, such as a microprocessor, for example. Processing device 18 may be a typical computer processing chip or processor, such as an Intel Pentium™ chip, for example. Alternatively, the term "processing device" denotes any suitable electronic device utilized by the computer which generates heat when operating. The terminology "processing device" is utilized herein to generally denote all heat-generating electronic components, because, in current computer designs, the main processing chip or processor chip often requires a significant amount of power and thereby generates a significant amount of heat when operating. Accordingly, for the purposes of cooling a wearable computer in accordance with the principles of the present invention, the processing devices or processors are usually the primary concern, and are therefore discussed for the purpose of illustration. As such, the term "processing device" is not meant to be limiting and is not limited to only microprocessors or other processors.

As illustrated in the Figures, the chassis 12, and particularly the upper and lower portions 12a and 12b of the chassis, house and contain the various circuit boards 14, 16, the processing device 18, and other electronic devices and components which make up the functioning hardware of the computer 10. The chassis, and particularly the chassis portions 12a, 12b includes an inner surface 20 and an outer surface 22. In accordance with one aspect of the present invention, a portion 24 of the chassis inner surface 20 is positioned proximate to processing device 18 when circuit boards 14 and 16 are positioned within the chassis 12 (see FIG. 3). Illustrated in the drawing, the inner surface portion 24 is indicated as a square or rectangular shape, but may take any suitable shape in accordance with the principles of the present invention. The inner surface portion 24 may be raised from the rest of the inner surface 20 as illustrated in FIG. 1. Preferably, the surface portion is configured to define a very small space or gap between the chassis 12 and processing device 18. A gap in the order of 1 mm, for example, may be desirable in one embodiment of the invention. Also, close tolerances are desired between surface portion 24 and processing device 18 to yield a close tolerance in the gap between the two. The smaller portion 24 (relative to the larger inner surface 20) ensures that such close tolerances do not have to be maintained over the whole chassis 12 or surface 20. This is desirable, for example when the chassis is die cast.

In accordance with another aspect of the present invention, a sheet of thermally conductive interface material 28 is positioned between, and simultaneously contacts, both the processing device 18 and the inner surface portion 24 of chassis 12. The thermally conductive interface material 28 has thermally conductive properties and thereby thermally couples the processing device to surface portion 24 and the chassis 12, and specifically to the chassis lower portion 12b proximate to the inner surface portion 24. Accordingly, heat generated by the processing device 18 is removed from device 18 and is delivered through the interface material 28 to the chassis 12 to be dissipated.

To that end, the outer surface 22 of the chassis 12, and particularly the outer surface 22 of the chassis lower portion 12b, is configured for efficiently dissipating heat from the chassis 12. In one embodiment of the invention, as illustrated in the Figures, the bottom surface of the lower chassis portion 12b includes a plurality of fins 30 formed thereon which run along the length of the chassis and are operable to convectively dissipate heat from the chassis. More specifically, the fins 30 convectively dissipate heat delivered to the chassis 12 from the processing device 18 through the thermally conductive interface material 28. The fins are shown to have a straight shape along the length of chassis 12; however, fins of various shapes may be utilized.

A suitable thermally conductive interface material 28 is compliant or malleable and has thermal properties which make it highly thermally conductive in order to efficiently transfer heat from the processing device 18 to the chassis 12. The compliant material is sandwiched in the gap between chassis surface portion 24 and the exposed surface of the processing device, and is preferably pressed or squeezed between the processing device 18 and inner surface portion 24 to ensure efficient heat transfer. Again, the tolerances in the gap are desirable for consistent contact with the interface material. The thermally conductive interface material 28 should be sufficiently compliant to avoid undue pressure on the processing device 18 when the material 28 is pressed into place. Suitable thermally conductive interface materials include T-Flex 440 material available from Thermagon of Cleveland, Ohio. Another suitable material is Chomerics 8574, available from Chomerics of Woburn, Mass. Thermally conductive interface material 28 should be configured in size and shape to provide suitable thermal contact with both processing device 18 and surface portion 24 for efficient heat transfer. For example, the material 28 may be the same size as the device to be cooled, e.g., the processing device, or may be larger or smaller. The material preferably should be large enough to cover the heated die or chip portion of the device for effective cooling. Similarly, the size of the inner surface portion 24 contacting material 28 might be of various appropriate sizes, depending on the device to be cooled and the chassis. A larger size material 28 and surface portion 24 will tend to spread the heat more over the chassis.

The external chassis 12, and at least the lower portion 12b, is fabricated of a high thermally conductive material, such as magnesium, aluminum, or copper, as noted above. Such materials have a high rate of heat transfer to the external or outer surface 22 of the chassis with a minimal temperature rise at the chassis contact point or inner surface portion 24. In that way, the heat is efficiently conductively dissipated in the chassis, away from the processing device. The plurality of fins 30 then convectively dissipate the heat from the processing device 18 and chassis 12 to the surrounding air. The fins encourage a high rate of convective heat transfer to the air surrounding the chassis 12, as is known according to thermodynamic principles.

Figure 2:
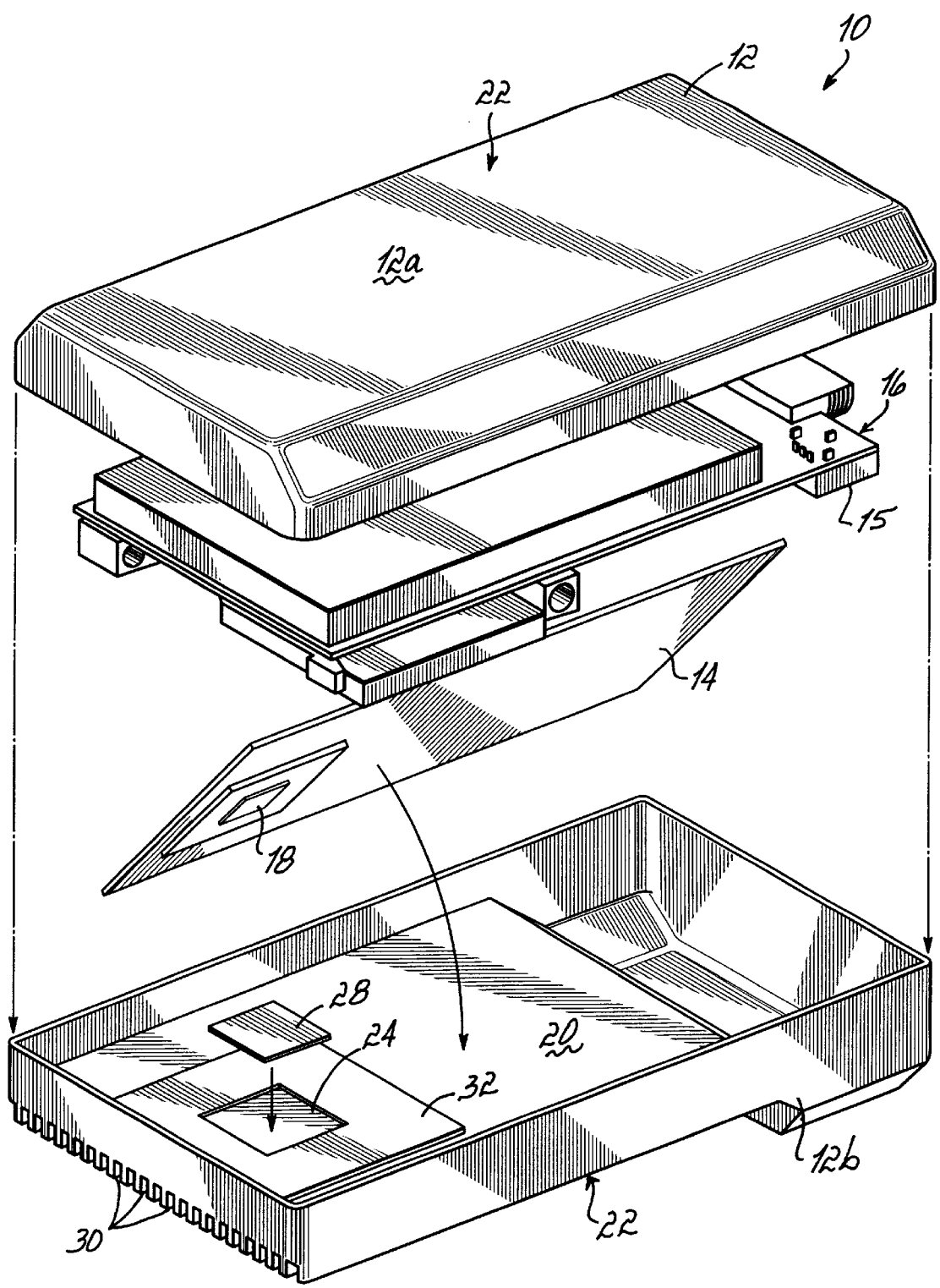
FIG. 2 is an alternative exploded perspective view illustrating an additional cooling component in accordance with the principles of the present invention.

In accordance with another aspect of the present invention, computer 10 comprises an amount of phase-change material 32 which is positioned on the inner surface 20 of the chassis 12, proximate the processing device. In FIG. 2, the phase-change material 32 is shown positioned around the inner surface portion 24 of the chassis which contacts the thermally conductive interface material 28. The phase-change material is thermally coupled to chassis 12 and particularly to the lower portion 12b of the chassis and is operable for absorbing heat from the processing device 18 and chassis 12 to assist in the dissipation of heat from the processing device 18, to further cool the processing device. The phase-change material is operable for changing phase upon absorption of an amount of heat to assist the chassis in removing heat from the processing device 18.

For example, the computer 10 and chassis 12 may be carried or worn such that the fins 30 of the outer or external surface 22 of the chassis are positioned or placed in an orientation which reduces the movement of air over the fins and thus reduces the natural convection of heat from the fins 30 and the finned surface 22 which they create. When the convective heat transfer from chassis surface 22 is reduced, the temperature of the processing device 18 and chassis 12 may begin to rise and the heat generated by the processing device will seek an additional dissipation path. The amount of phase-change material 32 provides an additional path for the heat dissipation from the chassis. As the phase-change material 32 absorbs an amount of heat from device 18 and from chassis 12, the material will change from a solid phase to a liquid phase. Generally, such a process requires that a relatively large amount of heat is delivered to the material. Therefore, the phase-change material 32 will dissipate a significant amount of heat which is generated by the processing device 18. The additional heat transfer path provided by the phase-change material 32 protects the processing device 18 from over-heating during those durations when the natural convection of heat from the chassis 12 through the fins is compromised.

As illustrated in FIG. 2, the phase-change material is shown to surround inner surface portion 24 and generally has the shape of a square or rectangle. Similarly, the thermally conductive interface material 28 and the processing device 18 are also illustrated as square or rectangular components, as noted above. Generally, electronic components and chips are formed in the shape of a square or rectangle. Accordingly, the cooling elements are illustrated with shapes such as shown in the Figures. However, it will be readily understood that the present invention is not limited to any specific geometric shape for the components to be cooled or the various cooling elements, such as the thermally conductive interface material 28 and the phase-change material 32.

One suitable phase-change material for the present invention is paraffin. Paraffin will generally be enclosed within a highly thermally conductive sealed container which is then thermally coupled to the inner surface 20 of chassis portion 12b. The paraffin and sealed container are illustrated collectively as element 32 in FIG. 2. The phase-change material 32 is configured so as not to interfere with the contact between the processing device 18, surface portion 24 and the interface material 28.

Figure 3:
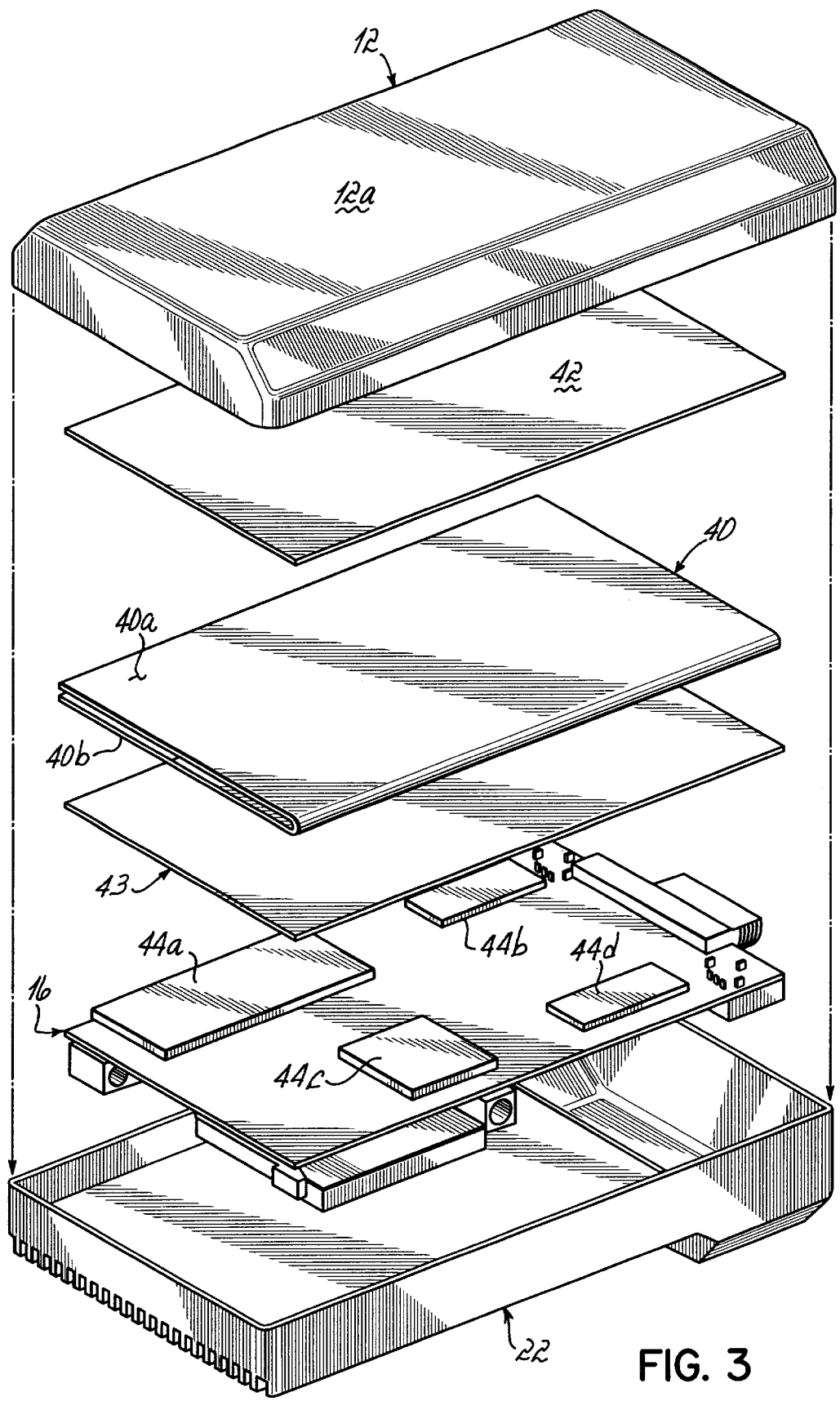
FIG. 3 is an alternative exploded perspective view illustrating an additional cooling component in accordance with the principles of the present invention.

Turning now to FIG. 3, another aspect of the present invention is disclosed and comprises a heat pipe structure 40 which is coupled to circuit board 16 for thermally dissipating heat from components on that circuit board. As illustrated in the Figures, the processing device 18 is oriented to contact the inner surface portion 24 of the chassis through material 28. However, various of the other electronic devices or components which generate heat do not make direct contact with the chassis and must be otherwise cooled. Heat pipe 40 is in the form of a flat, ribbon or ribbon-like heat pipe structure which is folded over to include an upper portion surface 40a and a lower portion surface 40b. The upper surface 40a is coupled to the chassis portion 12a through a suitable material, such as an adhesive or tape material 42. Preferably, the heat pipe 40 and surfaces 40a, 40b include a large effective surface area for efficiently dissipating heat throughout the chassis portion 12a.

Similarly, an adhesive or tape material 43 couples the lower surface 40b of the heat pipe to the various electronic components 44a, 44b, 44c, and 44d. As noted above, various electronic components of the computer generate heat, although the processor of a computer, is one of the more high power components which generates a significant amount of heat. Heat pipe 40 is thermally coupled to the components 44a–44d, and other components (not shown), and is operable for directing heat from those components to surface 40b and then to surface 40a, and ultimately to chassis 12 where it may be dissipated through convection. Heat pipes operate according to wellknown principles wherein surfaces or sections of the heat pipe absorb heat and transfer that heat, oftentimes through a liquid such as water, to another surface or portion of the heat pipe where it is removed or dissipated through convection or conduction. In one embodiment of the invention, the heat pipe 40 may be a copper ribbon or ribbon-like heat pipe, having a large surface area as shown for efficient heat conduction. The adhesive, or tape material 42, 43 utilized to physically couple the heat pipe 40 to the chassis portion 12 a and the components of circuit board 16 should also preferably have thermally conductive properties to ensure efficient heat transfer between the heat pipe 40 and the components of the circuit board 16 and the chassis 12.

Figure 4A:
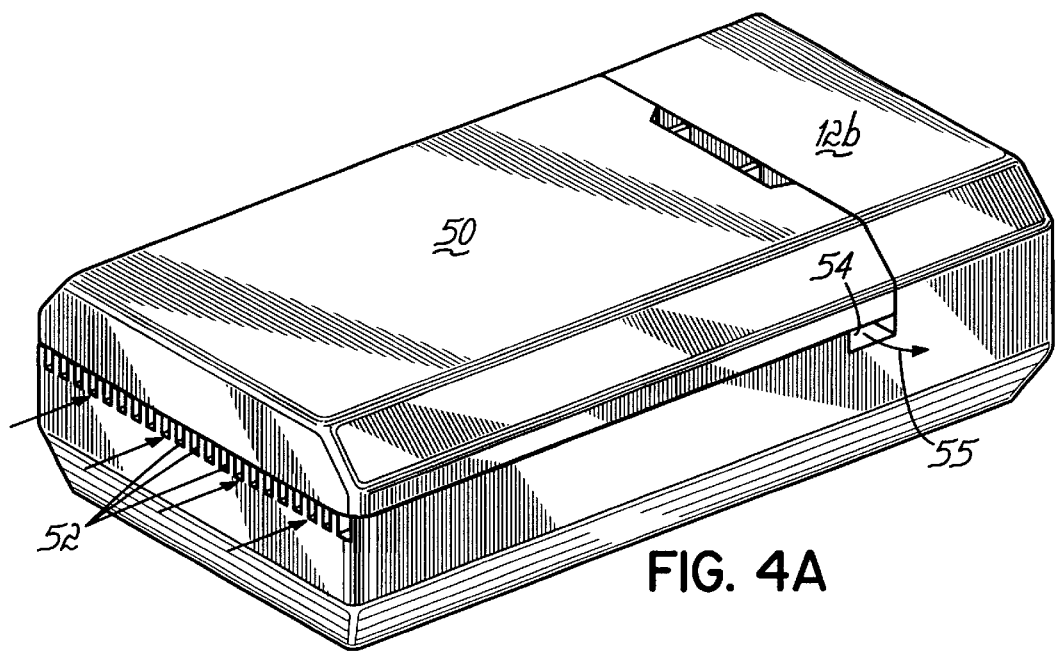
FIG. 4A is a perspective view of the embodiment of the invention illustrated in FIG. 1, illustrating a shroud structure in accordance with the principles of the present invention.
Figure 4B:
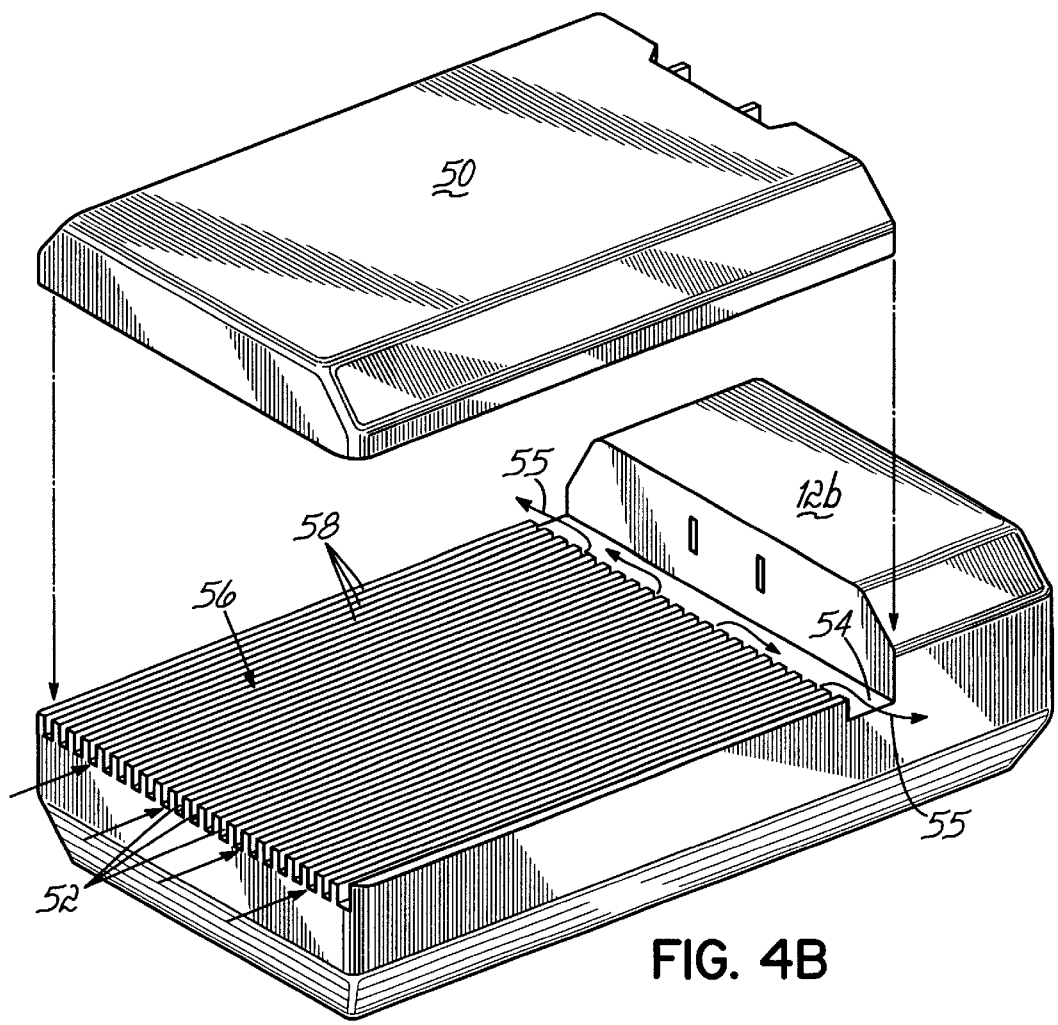
FIG. 4B is a similar view showing removal of the shroud structure.

In accordance with another aspect of the present invention, as illustrated in FIGS. 4A and 4B, the natural convective heat transfer from the fins 30 of the chassis 12 is enhanced by positioning a shroud 50 over the fins. Referring to FIG. 4A, the shroud 50, placed on the bottom portion 12b of the chassis, and particularly positioned over the fins 30, forms a series of air inlets 52 between the fins at one end of the chassis. Proximate the other end of the chassis, the shroud 50 is also configured for forming an air exhaust opening or chimney 54 with chassis 12 so that the heated air from between the fins may be exhausted. Covering the tips of the fins with the shroud 50 creates the defined air inlets 52 and exhaust opening 54 for airflow travel. The defined channels created by the fins 30 and shroud 50 provide a path for the cooling airflow along the heated fin surfaces. (See FIG. 4B.) As will be appreciated, as air heats up along the exposed fin surfaces, its density is reduced, and the buoyant force of the warmer air encourages it to flow through the channels from the inlets 52 to the exhaust opening 54. Of course, the air might also flow in the opposite direction, as well. The airflow ensures the efficient convective heat transfer by the fins.

FIG. 4b illustrates the shroud 50 removed from the fins to further show the exhaust opening 54 and the flow of air, as illustrated by reference arrows 55. The shroud 50 may be fabricated out of a material having low thermal conductivity, such as a suitable plastic, to further protect the computer user's skin from the heat of the chassis, and also to protect the computer user from direct contact with the heated fins 30.

In accordance with another aspect of the present invention, the shroud 50 may be utilized to house a computer component like a battery. For example, the battery case may form the shroud. That is, the element of reference numeral 50 in FIGS. 4a and 4b may be a battery with a suitably formed case for covering the fins.

If the shroud is not suitable for the design of the computer 10, or if the fins are otherwise difficult to cover, the fin tips along the surface 56 of the fins may be coated with a material having low thermal conductivity, illustrated by reference numeral 58. The material 58 acts as an insulator to the high temperature of the fin surfaces, and further protects the user's skin from the heat.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A computer comprising:
   a chassis having an inner surface and an outer surface;
   a processing device contained within the chassis, the processing device generating heat when operating;
   a portion of the chassis inner surface positioned directly proximate to and overlaying the processing device;
   a sheet of thermally conductive interface material positioned between and directly contacting the processing device and the inner surface portion to thermally couple the processing device to the chassis so that heat generated by the processing device is delivered directly to the chassis;
   the outer surface of the chassis configured for dissipating heat from the chassis.

2. The computer of claim 1 wherein the interface material is compliant.

3. The computer of claim 1 wherein said outer surface includes a plurality of fins for dissipating heat.

4. The computer of claim 1 wherein said processing device includes a processor.

5. The computer of claim 1 further comprising an amount of a phase-change material positioned on the inner surface of the chassis proximate the processing device, the phase-change material operable for absorbing heat generated by the processing device and changing phase upon absorption of an amount of heat to assist the chassis is removing heat from the processing device.

6. The computer of claim 1 including additional electronic devices which generate heat when operating, a heat pipe thermally coupled to at least one of said additional electronic devices and the chassis inner surface to absorb heat from the devices and transfer the heat to the chassis to be dissipated.

7. The computer of claim 1 wherein said heat pipe is in the form of a ribbon, one surface of the ribbon coupled to the at least one said additional electronic device and another surface of the ribbon coupled to the chassis inner surface.

8. The computer of claim 1 wherein said inner surface portion is raised above the chassis inner surface.

9. The computer of claim 3 further comprising a shroud positioned over the fins, the shroud configured to form at least one restricted air passage to more efficiently direct air across the fins.

10. The computer of claim 3 further comprising a coating positioned on the fins and having a low thermal conductivity to thermally insulate the fins.

11. The computer of claim 9 wherein said shroud is formed of a material having low thermal conductivity to thermally insulate the fins.

12. The computer of claim 9 wherein said shroud encases a battery.

13. A computer comprising:
   a chassis having an inner surface and an outer surface;
   a plurality of heat-generating electronic devices contained in the chassis;
   a portion of the chassis inner surface positioned directly proximate to and overlaying at least one of the electronic devices;
   a sheet of thermally-conductive interface material positioned between and directly contacting the electronic device and the inner surface portion to thermally couple the device to the chassis so that heat generated by the device is delivered directly to the chassis;
   the outer surface of the chassis configured for dissipating heat from the chassis.

14. A method for cooling a computer which has heat-generating electronic devices contained within a chassis, the method comprising:
   positioning a portion of an inner surface of the chassis directly proximate to and overlaying at least one of the heat-generating devices;
   positioning a sheet of thermally conductive interface material between the device and the inner surface portion and directly contacting the device and surface portion with the sheet to thermally couple the device to the chassis so that heat generated by the device is delivered directly to the chassis;
   configuring an outer surface of the chassis so that it is operable for dissipating heat from the chassis to cool the computer.

15. The method of claim 14 wherein the interface material is compliant, the method further comprising pressing the interface material between the inner surface portion and the heat-generating device.

16. The method of claim 14 further comprising positioning a plurality of fins on the outer surface of the chassis for dissipating heat.

17. The method of claim 14 further comprising positioning an amount of a phase-change material on the inner surface of the chassis proximate the device wherein the phase-change material is operable for changing phase upon absorption of an amount of heat, and absorbing heat with the phase-change material to assist the chassis in cooling the computer.

18. The method of claim 14 further comprising thermally coupling a heat pipe to another of the heat-generating electronic devices and to the chassis inner surface to absorb heat from the device and transfer the heat to the chassis to be dissipated.

19. The method of claim 14 further comprising raising said inner surface portion above the chassis inner surface.

20. The method of claim 16 further comprising positioning a shroud over the fins, wherein the shroud is configured to form a restricted air passage to more efficiently direct air across the fins.

21. The method of claim 20 wherein said shroud is formed of a material having low thermal conductivity to thermally insulate the fins.

22. The method of claim 18 wherein said heat pipe is in the form of a ribbon having multiple surfaces, the method comprising coupling one surface of the ribbon to the heat-generating electronic device and coupling another surface of the ribbon to the chassis inner surface.

23. The method of claim 16 further comprising positioning a coating on the fins having a low thermal conductivity to thermally insulate the fins.

* * * * *